United States Patent [19]
Codina

[11] 3,736,033
[45] May 29, 1973

[54] GYROSCOPIC REFERENCE SYSTEM

[76] Inventor: Jorge G. Codina, 223 Secor Road, Hartsdale, N.Y. 10530

[22] Filed: Mar. 16, 1972

[21] Appl. No.: 235,370

[52] U.S. Cl. .................................................308/10
[51] Int. Cl. ............................................F16c 39/06
[58] Field of Search .....................308/10; 74/5, 5.45

[56] References Cited

UNITED STATES PATENTS

| 3,262,326 | 7/1966 | Schott | 308/10 |
| 3,619,014 | 11/1971 | Quick | 308/10 |
| 3,399,002 | 8/1968 | Atkinson | 308/10 |
| 3,262,325 | 7/1966 | Senstad | 308/10 |
| 3,508,445 | 4/1970 | Penney | 308/10 |
| 3,508,444 | 4/1970 | Sitomer | 308/10 |

Primary Examiner—R. Skudy
Attorney—Leo A. Rosetta, Francis D. Thomas, Jr., Jesse B. Grove et al.

[57] ABSTRACT

A single core has an energizing winding and establishes a levitational magnetic field therebelow. A skeletal sphere is suspended in the field and opposed electromagnets cause the suspended sphere to rotate as the rotor of an induction motor to thus provide a gyroscopically stable inertial reference.

4 Claims, 1 Drawing Figure

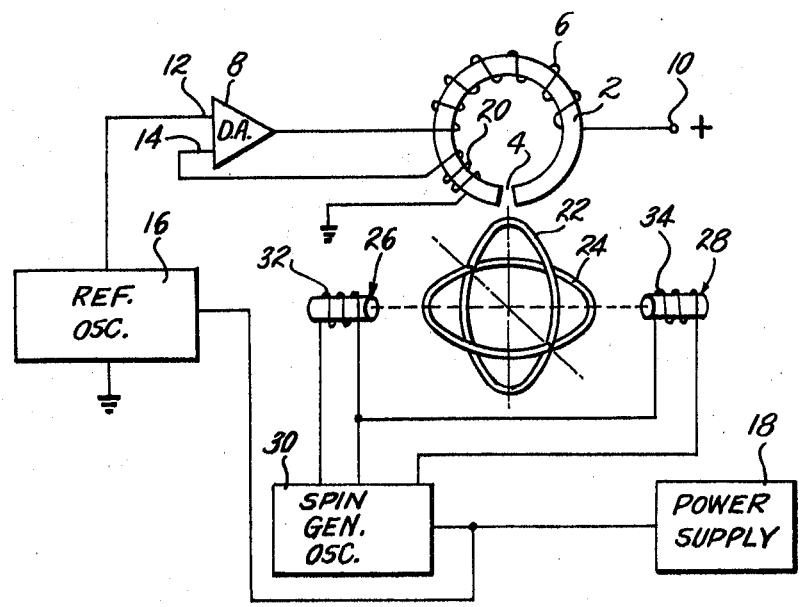

GYROSCOPIC REFERENCE SYSTEM

BACKGROUND OF THE INVENTION

This invention relates to gyroscopes and particularly to means for frictionlessly suspending a gyrorotor and for causing the same to spin.

Basically, when an object having mass is rotated at a relatively high speed, it assumes the characteristics of a gyroscope. The characteristic of rigidity in space is what makes the gyroscope useful as a reference or sensor unit in navigation systems.

Rigidity, also known as gyroscopic inertia, is a property of a gyro which resists any force tending to angularly displace the rotating body relative to its plane of rotation.

The main factors that affect the rigidity are the distribution and weight of its rotor and the speed at which the rotor spins. Obviously, it is desirable to have a maximum speed in order to minimize weight.

At present, if we neglect errors, speed is limited by bearing friction. Present attempts to minimize friction are largely directed to improving bearing design. The most successful ones, but still with drawbacks, are the gas or air bearing. Gas or air is used for lubrication and rotor support. The main disadvantage in the hydrostatic gas bearing is that it requires an external pressure source in the form of a pump which provides a metered flow at the desired pressure, plus the inherent unreliability of air supply systems.

On the other hand, hydrodynamic gas bearings, although not requiring an external pump, are nevertheless penalized by extremely critical tolerances in production and the disadvantage that contact between rotor and stator is maintained until the rotor reaches a speed sufficient to provide the fluid pressure needed to separate the two elements.

Other types of experiments are being conducted with cyrogenic gyros. They are in effect, a rotating body having journals floating in a magnetic field in which super-conductive magnetic bearings replace conventional gimbals. The practical aspects of such a design remains to be solved. Among the existing problems are: Not all metals become super-conductive at extremely low temperature, hence special elements like niobium must be used. Super-conductive materials are very sensitive to temperature and stray magnetic fields, requiring thermal insulation and magnetic shielding. Also a cryostat is necessary which substantially increases the size and cost of the system to the extent that its use is limited to experimental purposes.

SUMMARY OF THE INVENTION

The present invention seeks to eliminate prior problems encountered in this field and embodies a free mass of ferromagnetic material levitationally suspended in a magnetic field, with further electromagnetic means arranged to cause rotation of the mass about a preselected axis while it is frictionlessly suspended, to produce a gyroscopic reference.

It is, therefore, an object of this invention to provide a gyroscopic reference having no friction or wear and thus eliminating errors due to those causes.

Another object of the invention is to provide a practical and low-cost small gyroscopic system employing frictionless support at the rotor and very high speed thereof.

It is a still further object of the invention to provide a gyroscopic reference apparatus not requiring prolonged starting time and which operates with very low power consumption and which is of simple construction.

BRIEF DESCRIPTION OF THE DRAWING

The single FIGURE of the drawing is a schematic illustration of the essential components of the invention.

DESCRIPTION OF A PREFERRED EMBODIMENT

According to the illustrated form of the invention, a permeable magnetic core member 2 is provided, which is shown in the form of a toroidal member having a nonmagnetic gap 4 at the bottom thereof. An energizing coil 6 is wrapped around a substantial portion of the core 2 and is connected, at one end, to the output of a differential amplifier 8 and to a positive voltage terminal 10 at its other end. The differential amplifier 8 has dual inputs 12 and 14. As is known, the output of the amplifier 8 is an amplified signal comprising the difference between the amplitude of the signals at the input 12 and 14 when those signals are of opposite polarity and is the amplified sum of the amplitude of those signals when they are of the same polarity.

A reference oscillator 16 receives power from a power supply 18 and produces an alternating current output of predetermined fixed frequency. The output of the reference oscillator 16 is applied to the input 12 of amplifier 8 and the amplified output is directed through coil 6. The current flowing in coil 6 produces a magnetic field on the region below the gap 4, which field is capable of stably suspending a ferromagnetic body in space. A control winding 20 is also wound on core 2 and is thus magnetically coupled to the energizing coil 6. The coil 20 is connected at one end to ground and at its other end to input 14 of differential amplifier 8.

A ferromagnetic body comprising a pair of generally annular rings 22 and 24 is provided. The rings 22 and 24 are rigidly connected to each other so that they lie in mutually perpendicular planes with their centers coincident and thus define a skeletal sphere. Since the material of the rings 22 and 24 is ferromagnetic, the levitational magnetic field below the gap 4 will attract the entire ring assembly toward the magnet, assuming that the energizing coil 6 has current flowing therethrough. As the ring assembly approaches the gap in the core 2, the magnetic coupling between coils 6 and 20 changes, due to movement of the ring assembly, and a control signal is thus induced across coil 20. That signal is fed to the input 14 of amplifier 8 and is arranged to be of opposite polarity to the signal then entering input 12 from reference oscillator 16. Thus, the effect of the signal from coil 20 is to reduce the output of amplifier 8, reduce the current flowing in coil 6 and thus reduce the intensity of the magnetic field below the gap 4. This, of course, reduces the pull on the assembly of rings 22 and 24 and will continue to do so until the ring assembly comes to a stop and/or starts to fall away from the gap. If the ring assembly starts to fall away from the gap 4, the signal developed across coil 20 is reversed and the current through coil 6 is thus increased to stop the receding movement of the ring assembly. Either of the corrective actions described above happen at such high speed that, for all practical purposes, the assembly of rings 22 and 24 is suspended in fixed relation to the magnet core 2 without any apparent or perceptible vertical movement, irrespective of any forces acting to displace the ring assembly. Obviously, movements of the ring assembly relative to the gap 4 in any lateral direction will also develop a corrective signal across coil 20. The material of the rings 22 and 24 is not only ferromagnetic but is electrically conductive and a pair of electromagnets 26 and 28 is so arranged relative to the ring assembly that they serve as the field magnets of an electric motor when energized with alternating current.

The power supply 18 also supplies power to a spin generating oscillator 30, the output of which is an alternating current at predetermined frequency. That alternating current is applied to the coils 32 and 34 of electromagnets 26 and 28, and the resulting alternating field between the electromagnets traverses the position occupied by the ring assembly described and eddy currents generated in the latter cause the same to rotate at high speed about a fixed axis, thus establishing the rotating mass comprising rings 22 and 24 as a gyroscopic reference.

It is to be noted that the ring assembly constitutes, in effect, the rotor of an induction motor, frictionlessly supported for high speed rotation. The energization of electromagnets 26 and 28 is controlled to take place only after the ring assembly has achieved stable suspension in its levitational magnetic field.

It is contemplated that all elements of the system, except the ring assembly, be fixedly mounted on a vehicle to be navigated and it will be obvious that accelerations and movements of the vehicle in space will be reflected by a tendency of the ring assembly to respond as does a gyroscope and such responses may be measured by any of a multitude of known devices to determine deviations from the established gyroscopic reference. Obviously, the ring assembly may be enclosed within a housing from which air has been evacuated to thus further reduce resistance to rotation thereof and extremely high speeds at high stability can be achieved with a very small mass of material in the rotor. By virtue of the construction of the ring assembly, the electromagnets 26 and 28 may be so positioned as to produce rotation of the ring assembly or rotor about either a horizontal or vertical axis.

It is to be noted that change in any signal present across coil 20, and/or the current flow in coil 6 constitute indications of displacement forces acting on the rotor and may be measured in any suitable manner by means well known to those skilled in the art.

While a single specific embodiment of the invention has been shown and described herein, the same is merely illustrative of the principles involved and other embodiments may be resorted to within the scope of the appended claims.

I claim:

1. A gyroscopic reference system comprising:
    a single magnetic core means having a gap defined by horizontally spaced poles and an energizing winding on said core means for establishing an upright levitational magnetic field below said gap;
    a ferromagnetic body levitationally suspended in and by said magnetic field below said gap, said suspended body comprising a frictionlessly supported rotor; and
    electrical drive means for spinning said suspended body about a predetermined axis in said field thereby providing a spinning gyroscopic rotor.

2. A system as defined in claim 1 wherein said body includes a generally annular conductive portion; said drive means comprising at least two electromagnets arranged adjacent said annular portion angularly spaced about said axis and a source of alternating current connected to energize said electromagnets whereby to cause said body to spin as the rotor of an induction motor.

3. A gyroscopic reference system comprising:
    magnetic means establishing an upright levitational magnetic field;
    a ferromagnetic body levitationally suspended in and by said magnetic field, said suspended body comprising a frictionlessly supported rotor; and
    electrical drive means for spinning said suspended body about a predetermined axis in said field thereby providing a spinning gyroscopic rotor, said body including a generally annular conductive portion; said drive means comprising at least two electromagnets arranged adjacent said annular portion angularly spaced about said axis and a source of alternating current connected to energize said electromagnets whereby to cause said body to spin as the rotor of an induction motor, said body comprising a pair of rings of ferromagnetic electrically conductive material fixedly secured together in mutually perpendicular planes, the centers of said rings being coincident and one of said rings comprising said generally annular conductive portion.

4. A gyroscopic reference system comprising:
    magnetic means establishing an upright levitational magnetic field;
    a ferromagnetic body levitationally suspended in and by said magnetic field, said suspended body comprising a frictionlessly supported rotor; and
    electrical drive means for spinning said suspended body about a predetermined axis in said field thereby providing a spinning gyroscopic rotor,
    means including a core member; an energizing winding on said core member; a differential amplifier for supplying electrical energy to said energizing winding; a control winding magnetically coupled to said energizing winding and coupled to an input of said differential amplifier whereby the magnetic coupling between said windings changes in response to changes in the position of said body in said field, to thereby change the output of said differential amplifier to said energizing winding and thereby restore said body to its original position in said field.

* * * * *